INVENTOR
THOMAS H. OSTER

BY John R. Faulkner
Olin B. Johnson
ATTORNEYS

INVENTOR
THOMAS H. OSTER

BY John R. Faulkner
Olin B. Johnson
ATTORNEYS

United States Patent Office 3,281,138

Patented Oct. 25, 1966

3,281,138

PNEUMATIC SPRING

Thomas H. Oster, Dearborn, Mich., assignor to Ford Motor Company, Dearborn, Mich., a corporation of Delaware Filed Dec. 7, 1964, Ser. No. 416,478

4 Claims. (Cl. 267—1)

This invention relates to a pneumatic spring or cushioning device. In particular, this invention relates to an improved pneumatic compression spring of the type which includes a cylinder and piston forming an air chamber which is charged with air at a predetermined pressure when the piston is extended whereby inward movement of the piston will cause a decrease in volume in the chamber and a corresponding increase in pressure thus increasing the resistance to inward movement of the piston in the cylinder thereby cushioning such movement. Pneumatic springs operating in this manner are exemplified by the spring disclosed by W. E. Hennells, Sr., in U.S. Patent 3,101,194.

Pneumatic compression springs have found use as positioning and/or holding devices in conjunction with a wide variety of machines, dies, etc., for cutting, forming, shearing, shaping, etc., and have other applications where spring, shock absorber or equalizer functions are required.

One object of this invention is to provide a pneumatic compression spring in which air pressure is utilized in an effective, simplified manner in conjunction with various types of pneumatic tools.

It is another object of this invention to provide a pneumatic compression spring from which water and other foreign matter is forced from the air chamber at a point removed from the working surface of the spring when the pressure therein exceeds a predetermined level.

The above as well as additional objects of the present invention will be more readily understood from its following detailed description when read in conjunction with the accompanying drawings, wherein.

Figures 1, 2:
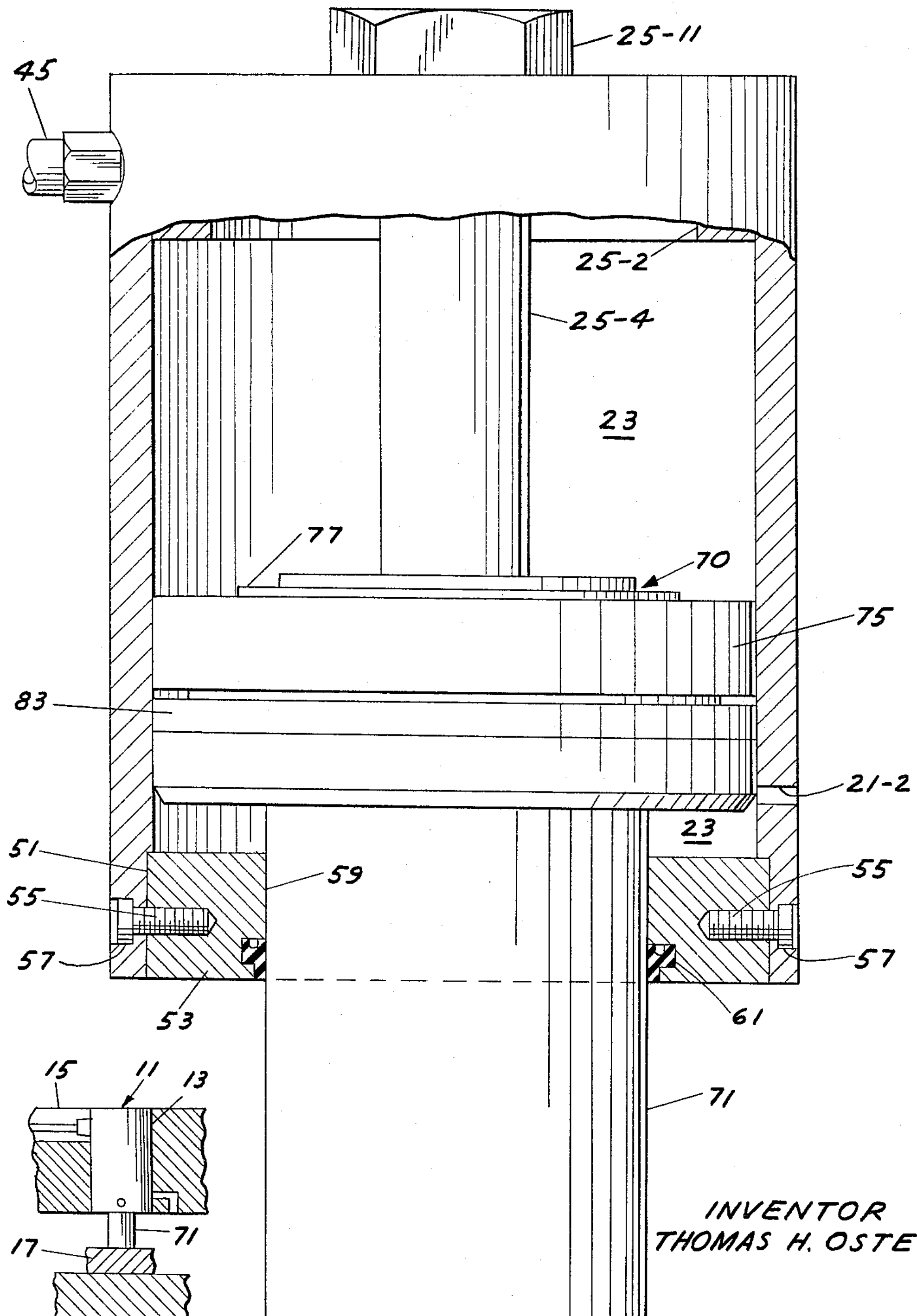
FIGURE 1 is a partial sectional view of a holding device which includes the pneumatic spring of this invention in operational contact with a workpiece.
FIGURE 2 is a side elevation of the pneumatic spring of FIGURE 1 with portions cut away to show the piston within the cylinder with the piston rod extending therefrom.

Referring now to FIGURE 1, the pneumatic spring 11 of this invention is shown mounted within socket 13 of spring support member 15 which represents a part of a holding device. Below piston rod 71 of pneumatic spring 11 is positioned a workpiece 17 which in turn is shown resting upon a workpiece support 19. The support members 15 and 19 may be separate or connected and each may be either fixed or movable. In those embodiments of the holding device wherein support member 19 is fixed and support member 15 is movable, piston rod 71 is brought into position to reach workpiece 17 through movement of member 15 in the direction of the workpiece. In other embodiments of the holding device, workpiece 17 is brought within reach of piston rod 71 either by vertical movement of workpiece support 19 or by virtue of its own height when resting upon support 19. The workpiece 17 when held between piston rod 17 and support 19 is then ready to be subjected to the cutting, shearing, punching or other shaping function desired.

As shown in FIGURE 1, the pneumatic spring 11 is partially compressed and is applying clamping force to the workpiece 17 through piston rod 71.

The pneumatic spring 11 includes a hollow cylindrical member 21 that has an essentially cylindrical internal surface 21–1 forming with other items hereinafter named and described a chamber 23 which has an essentially constant cross-sectional area. Chamber 23 is further enclosed by an end member 25 at the upper end thereof which is in screw threaded engagement with the inner surface of the cylindrical member 21. End member 25 may be secured in place by other suitable means such as welding or cylindrical member 21 and end member 25 may be integrally formed. As shown, end member 25 includes an end plate 25–1, a cylindrical depending flange 25–2 having a peripheral groove 25–3, a tubular hollow shaft 25–4 forming a cylindrical conduit 25–5, and an L-shaped bore or casting formed internal surface 25–6 through end plate 25–1 and the top portion of shaft 25–4 forming an L-shaped conduit or passageway 25–7 having an inlet 25–8 by means of which it communicates with cylindrical conduit 25–5 and an outlet 25–9 through which it communicates with the outside atmosphere. Conduit 25–7 is provided with groove 25–10 in which is seated a ball check valve assembly 27 which includes a check valve housing 27–1 having a passageway 27–2 and a ball check valve 27–3 urged into seating engagement with the end of the passageway 27–2 by a spring 27–4 providing a one-way valve which will enable air and water to escape from the interior of device 11 as hereinafter described. Cylindrical flange 25–2 may be separately formed, if desired. The end member 25 is also provided with an integrally formed projection 25–11 for use in turning member 25 to effect threaded engagement with cylindrical member 21 and/or for ease of removal and insertion of pneumatic spring 11 in the socket 13.

The cylindrical member 21 is provided with an opening 31 adjacent the upper end thereof in alignment with a screw threaded opening 33 in flange 23–2 on end member 23. The threaded opening 33 receives an adapter fitting 35 which may have a quick disconnect coupling for engagement by an air supply line 45 received in a recess in the spring support member 15. Threaded into the opening 33 from the inner end thereof is a check valve housing 37 having a passageway 39 and a ball check valve 41 urged into seating engagement with the end of the passageway 39 by a spring 43 thereby providing a one-way check valve which will enable air to enter into the interior of the cylindrical member 21 but will not permit air to exit therefrom through the adapter fitting 35 into the supply line 45.

The lower end of the cylindrical member 21 is provided with a shoulder 51 spaced from the lower end thereof which engages an annular bearing plate 53 which is held in position by a plurality of screws 55 having the heads thereof disposed in countersink areas 57 in the exterior surface of the cylindrical member 21. The annular bearing plate 53 is provided with a central opening 59 which has a groove 61 adjacent the lower edge thereof.

A piston assembly designated by the numeral 70 is reciprocable within the cylindrical member 21 and includes a hollow piston rod 71 which has an external surface of constant cross-sectional area for sliding movement in the opening 59 in the bearing plate 53.

The piston rod 71 comprises a tubular member 73 which is provided with a peripheral shoulder 73–1 in spaced relation to the upper end thereof which receives an annular piston member 75 that is held in position by a snap ring 77 received within a groove 73–2 within and adjacent the upper end of the tubular member 73. The snap ring 77 rigidly holds the piston 75 on the tubular member 73 and an O-ring seal 81 resting in groove 75–1 is disposed between the inner surface of the annular piston member 75 and the external surface of the tubular member 73.

The external peripheral surface of the piston member 75 is provided with a peripheral groove 75–2 which receives a peripheral ring 83 of resilient material and of substantially U-shaped configuration. Groove 75–2 is slightly larger in height than the ring 83 and the area of piston 75 extending above the groove 75–2 is provided with a series of vertical air passageways 85 communicating with the top of the piston member 75 wherein air may pass downwardly through the passageway 85 and force the seal ring 83 into engagement with the internal surface of cylindrical member 21.

The cylindrical member 21 is also provided with a bleed conduit 21–2 immediately above the bearing plate 53 which provides an air inlet during the upward movement of the piston member 75 and an exhaust means for air trapped between the bearing plate 53 and the piston member 75 when piston member 75 is in its downward movement. The bleed conduit may be equipped with a filter to prevent inflow of foreign material into this area.

Figure 3:
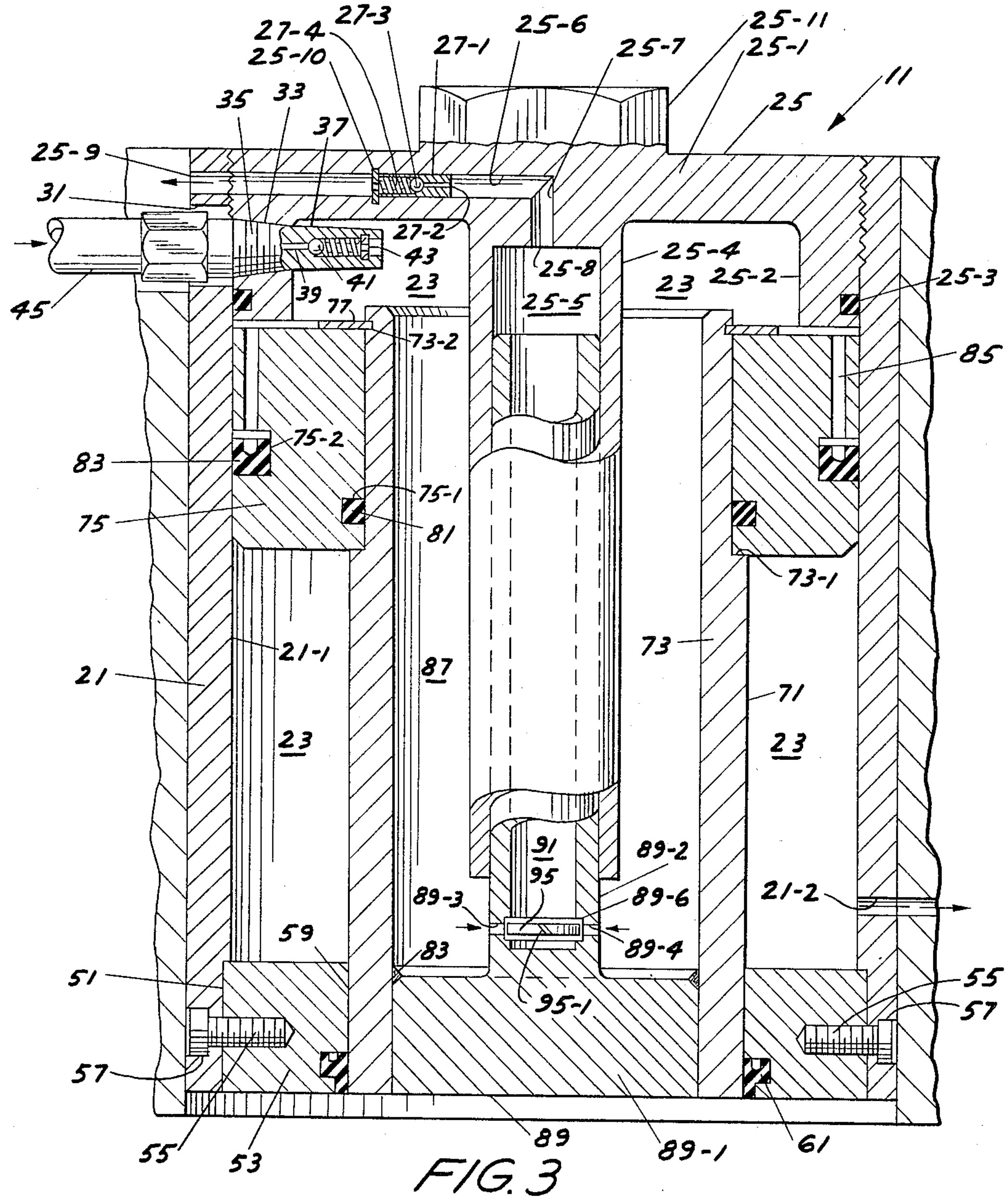
FIGURE 3 is a vertical sectional view of the pneumatic spring of the preceding figures with the piston at its uppermost position within the cylinder.

The interior surfaces of tubular member 73 of piston rod 71 form a chamber 87 closed at the end opposite piston member 75 with an end member 89. End member 89 comprises a circular end plate 89–1 which supports a tubular shaft 89–2 which is positioned, constructed and arranged to pass inside and telescope with tubular shaft 25–4 of end member 25. Tubular shaft 89–2 is provided with slots 89–3 and 89–4 spaced between end plate 89–1 and the lower edge of tubular shaft 25–4 when the piston assembly 70 is in its uppermost position as shown in FIGURE 3. The clearance between tubular shaft 89–2 and tubular shaft 25–4 is insufficient to admit of the escape of water therebetween. The internal surfaces of tubular shaft 89–2 form a chamber 91 which is closed at its lower end. The end plate 89 is secured to the tubular member 73 by welding 93 or other suitable means providing an air tight seal with cylindrical member 73.

In the embodiment shown tubular shaft 89–2 has an annular groove 89–6 which extends above and below and communicates with slots 89–3 and 89–4. Resting within groove 89–6 is a compressible ring member 95 having a transverse slit 95–1. Ring member 95 in its expanded state of rest closes slots 89–3 and 89–4 preventing fluid communication between chamber 87 and chamber 91. At a predetermined pressure level within chamber 87 and slots 89–3 and 89–4 ring member 95 is compressed sufficiently to admit of fluid flow from chamber 87 through slots 89–3 and 89–4 into chamber 91.

In a preferred embodiment the respective parts of this pneumatic spring are sized, constructed and arranged in a manner such that the inward movement of piston assembly 70 from its outermost operating position reduces the volume of the compartment formed by chamber 87 and that portion of chamber 23 communicating therewith to a significantly smaller percentage of its maximum volume than is the volume of chamber 91. This arrangement in conjunction with the relatively small openings between chambers 87 and 91 results in a pressure differential between such chambers and provides a pumping action for intermittently consistent transfer of fluids from chamber 87 to chamber 91 and ultimately from the system.

With the device installed as illustrated in FIGURE 1, air under predetermined pressure such as normal service line pressure is admitted via air supply line 45 and ball check valve 41 into the hollow interior of the cylindrical member 21 above the piston 75 thus filling chamber 87 of hollow piston rod 71 and that portion of chamber 23 above piston member 75 whereby the piston 75 is moved downwardly until piston rod 71 contacts a workpiece or to a position adjacent to the annular bearing plate 53. Thus, when the bottom of the piston rod 71 engages a surface, the article engaged will be held and/or moved by pressure exerted thereon. A subsequent movement of spring support member 15 toward the workpiece 17 or pressure exerted through the workpiece 17 against piston rod 71 will cause an increase in the pressure exerted by the piston due to the decrease in volume in the compartment formed by chambers 87 and 23 since the piston member 75 is moving inwardly in relation to the cylindrical member 21. Thus, as the pressure exerted on the device is increased, the working force exerted by the device is increased. If excessive pressure is created in the device, chamber 87 ring member 95 is compressed thereby admitting of air release into chamber 91 from whence it escapes via chamber 25–5, conduit 25–7 and ball check valve 27. When this pressure falls below a predetermined level ring member 95 expands against the remaining pressure to close slots 89–3 and 89–4. Some air admitted into chamber 87 is lost and replaced in the continued use of the instant device, and in the course of repeated compressions and expansions of such air, water tends to collect in the bottom of chamber 87. As the water level rises the remaining volume of the air chamber formed by chamber 87 and that portion of chamber 23 above the piston assembly 70 decreases accordingly. Thus, if the mode of operation is unchanged the pressure within the air chamber gradually increases in chambers 87 and 23 in the embodiment illustrated. Slots 89–3 and 89–4 are thus placed near the bottom of chamber 87 and provide means for exhausting water from the device when the pressure within chamber 87 becomes sufficient to force open the one-way valve represented by ring member 95 as aforedescribed. It will be understood by those skilled in the art that other types of one-way valves, e.g. a ball check valve such as valve 41, may be used in lieu of ring member 95 to control the flow of air and/or water into chamber 91. In a different embodiment slots 89–3 and 89–4 are retained but the one-way valve associated therewith is eliminated and the aforementioned pressure increase works directly against ball check valve 27. In each of the aforementioned embodiments water and other foreign matter is dispelling via conduit 25–7 and is discharged at a point removed from the working surface of the piston rod which contacts the workpiece.

In practical operation, the device is ordinarily employed with a line pressure of about 75 to about 125 p.s.i. with a ratio of about 2:1 and with an application of more than 100 cycles per minute.

It will be understood that the invention is not to be limited to the exact construction shown and described, but that various changes and modifications may be made without departing from the spirit and scope of the invention, as defined in the appended claims.

I claim:

1. A pneumatic spring comprising a tubular member, a first end member extending into and positioned at one end of said tubular member, a piston slidably disposed within said tubular member, a piston rod connected to the piston and extending outwardly through the end of the tubular member opposite said first end member, a bearing plate for slidably receiving the piston rod for guiding the movement thereof, limiting the outward movement of the piston and closing the end of said tubular member and stop means for limiting the inward movement of the piston, said first end member comprising a first end plate closing one end of said tubular member and a first tubular shaft depending from said end member and extending partially through said tubular member, said first end plate having a passageway therein providing means for fluid communication between the interior of said first tubular shaft and the exterior of said spring, said piston rod comprising a hollow cylindrical member having an open end communicating through the piston with a first air chamber formed within said tubular member between said piston, said piston rod and said end member, the end of said piston rod opposite said open end being closed by a second end member comprising a second end plate and a second tubular shaft depending from said second end plate, extending into said tubular member and into sliding, telescopic engagement with said first shaft forming a second air chamber between said first end member and said tubular shaft in fluid communication with said passageway, said second tubular shaft having at least one opening situated therein between said second end plate and said first tubular shaft when said piston is against said stop means and providing means for fluid communication between said first air chamber and said second air chamber, a pressure release check valve in said passageway within said first end plate for relieving pressure in excess of a predetermined value within said second air chamber and for discharging foreign matter therefrom; and an inlet valve mounted on said tubular member above said stop means for admitting air under pressure into said air chamber.

2. A pneumatic spring in accordance with claim 1 wherein the respective parts thereof are constructed and arranged in a manner such that said inward movement of said piston member from its outermost operating position reduces the volume of said first air chamber by a significantly greater volume percentage than such movement reduces the volume of said second air chamber.

3. A pneumatic spring comprising a tubular member, a first end member extending into and positioned at one end of said tubular member, a piston slidably disposed within said tubular member, a piston rod connected to the piston and extending outwardly through the end of the tubular member opposite said first end member, a bearing plate for slidably receiving the piston rod for guiding the movement thereof, limiting the outward movement of the piston and closing the end of said tubular member and stop means for limiting the inward movement of the piston, said first end member comprising a first end plate closing one end of said tubular member and a first tubular shaft depending from said end member and extending partially through said tubular member, said first end plate having a passageway therein providing means for fluid communication between the interior of said first tubular shaft and the exterior of said spring, said piston rod comprising a hollow cylindrical member having an open end communicating through the piston with the air chamber within said tubular member between the piston and said end member, the end of said piston rod opposite said open end being closed by a second end member comprising a second end plate and a second tubular shaft depending from said second end plate, extending into said tubular member and into sliding, telescopic engagement with said first tubular shaft, said second tubular shaft having at least one opening situated therein between said second end plate and said first tubular shaft when said piston is against said stop means and providing means for fluid communication between the interior of said second tubular shaft and the remainder of the interior of said piston rod, a pressure release check valve in said passageway within said first end plate for relieving pressure in excess of a predetermined value within said first tubular shaft and for discharging foreign matter therefrom, a one-way pressure release valve within said second tubular shaft constructed and arranged to permit fluid flow into said second tubular shaft through said hole when the pressure outside said second tubular shaft exceeds a predetermined value and an inlet valve mounted on said tubular member above said stop means for admitting air under pressure into said air chamber.

4. A pneumatic spring comprising a tubular member, a first end member extending into and positioned at one end of said tubular member, a piston slidably disposed within said tubular member, a piston rod connected to the piston and extending outwardly through the end of the tubular member opposite said first end member, a bearing plate for slidably receiving the piston rod for guiding the movement thereof, limiting the outward movement of the piston and closing the end of said tubular member and stop means for limiting the inward movement of the piston, said first end member comprising a first end plate closing one end of said tubular member and a first tubular shaft depending from said end member and extending partially through said tubular member, said first end plate having a passageway therein providing means for fluid communication between the interior of said first tubular shaft and the exterior of said spring, said piston rod comprising a hollow cylindrical member having an open end communicating through the piston with the air chamber within said tubular member between the piston and said end member, the end of said piston rod opposite said open end being closed by a second end member comprising a second end plate and a second tubular shaft depending from said second end plate, extending into said tubular member and into sliding, telescopic engagement with said first tubular shaft, said second tubular shaft having at least one opening situated therein between said second end plate and said first tubular shaft when said piston is against said stop means and providing means for fluid communication between the interior of said second tubular shaft and the remainder of the interior of said piston rod, a one-way pressure release valve within said second tubular shaft constructed and arranged to permit fluid flow into said second tubular shaft through said hole when the pressure outside said second tubular shaft exceeds a predetermined value and an inlet valve mounted on said tubular member above said stop means for admitting air under pressure into said air chamber.

No references cited.

ARTHUR L. LA POINT, *Primary Examiner.*

R. M. WOHLFARTH, *Assistant Examiner.*